(12) United States Patent
Fletcher et al.

(10) Patent No.: US 8,471,002 B2
(45) Date of Patent: Jun. 25, 2013

(54) BETA-SERUM DAIRY PRODUCTS, NEUTRAL LIPID-DEPLETED AND/OR POLAR LIPID-ENRICHED DAIRY PRODUCTS, AND PROCESSES FOR THEIR PRODUCTION

(75) Inventors: Katrina Fletcher, Palmerston North (NZ); Owen Catchpole, Wellington (NZ); John Bertram Grey, Wellington (NZ); Mark Pritchard, Palmerston North (NZ)

(73) Assignee: Fonterra Co-Operative Group Limited (NZ)

( * ) Notice: Subject to any disclaimer, the term of this patent is extended or adjusted under 35 U.S.C. 154(b) by 923 days.

(21) Appl. No.: 11/577,190

(22) PCT Filed: Oct. 12, 2005

(86) PCT No.: PCT/NZ2005/000262
§ 371 (c)(1),
(2), (4) Date: Oct. 2, 2007

(87) PCT Pub. No.: WO2006/041316
PCT Pub. Date: Apr. 20, 2006

(65) Prior Publication Data
US 2008/0139499 A1    Jun. 12, 2008

(30) Foreign Application Priority Data

| Oct. 12, 2004 | (NZ) | 535894 |
| Oct. 13, 2004 | (NZ) | 535920 |
| May 31, 2005 | (NZ) | 540445 |

(51) Int. Cl.
| C07H 1/06 | (2006.01) |
| C07H 1/00 | (2006.01) |
| A23C 9/12 | (2006.01) |
| A61K 31/70 | (2006.01) |
| A61K 31/715 | (2006.01) |

(52) U.S. Cl.
USPC .............. 536/124; 536/127; 514/23; 514/53; 426/34

(58) Field of Classification Search
USPC .............. 514/23, 53; 536/124, 127; 426/34
See application file for complete search history.

(56) References Cited

U.S. PATENT DOCUMENTS

| 4,157,404 | A | 6/1979 | Yano et al. |
| 4,234,619 | A | 11/1980 | Yano et al. |
| 4,762,822 | A | 8/1988 | Ettinger |
| 5,518,751 | A | 5/1996 | de Boer et al. |
| 5,677,472 | A | 10/1997 | Nyberg et al. |
| 5,709,888 | A | 1/1998 | Gil et al. |
| 6,391,362 | B1 | 5/2002 | Gorewit |
| 2004/0202765 | A1 | 10/2004 | McMahon et al. |
| 2005/0032742 | A1 | 2/2005 | DeFrees |
| 2006/0057271 | A1 | 3/2006 | Kubota et al. |
| 2006/0240115 | A1 | 10/2006 | Kanamaru et al. |
| 2006/0275333 | A1 | 12/2006 | Trimble |
| 2009/0123630 | A1 | 5/2009 | Burling et al. |

FOREIGN PATENT DOCUMENTS

| CN | 1489914 | 4/2004 |
| EP | 1623717 A1 | 2/2006 |
| GB | 1 347 727 | 2/1974 |
| GB | 2 087 211 A | 5/1982 |
| JP | 05-030903 | 2/1993 |
| JP | 2000-350563 | 12/2000 |
| JP | 2003 003192 | 8/2003 |
| JP | 2003 235462 | 8/2003 |
| JP | 2003 304814 | 10/2003 |
| RO | 85044 | 9/1984 |
| WO | WO 91/14377 | 10/1991 |
| WO | WO 94/18289 A1 | 8/1994 |
| WO | WO 02 34062 A1 | 5/2002 |
| WO | WO 2004/066744 A1 | 8/2004 |

OTHER PUBLICATIONS

Asano, K, et al. Masking of phosphatidylserine inhibits apoptitic cell engulfment and induces autoantibody production in mice. *J. Experim. Med.*, 200, 459-467, 2004.
Astairee JC, Vyas HK & Jimenez-Flores R, Extraction of Lipids from Buttermilk using Supercritical Carbon Dioxide J. Dairy Sc., 85 Supplement 1, 288 (2002).
Carlson, S.E. N-acetylneuraminic (sialic) acid concentrations in human milk oligosaccaharides and glycoproteins during lactation. *Am. J. Clin. Nutrition*, 41, 720-726, 1985.
GEA Westfalia Separator Food Tec GmHBH. Milk fat processing. Butter and Butteroil / AMF (Anydrous Milk fat). 1996.
Gopal, P.K. Gill, H.S. Oligosaccharides and glycoconjugates in bovine milk and colostrums. *Brit. J. Nutrition*, 984, suppl. 1, s69-274,2000.
Harrison, R. Physiological roles of xanthine oxidoreductase. *Drug Metab. Rev.* 36, 363-3754, 2004.
Hata,Y.et al. Glycoconjugates with NeuAc-NeuAc-Gal-Glc are more effective at precenting adhesion of Heliobacter phylori to astric epithelial celsl than glycoconjugates with NeuAc-Gal-Glc. *J. Physio. And Pharmacol.* 55, 607-625, 2004.
Kvistgaard, A.S. et al. Inhibitory effects of human and bovine milk constituents on rotovirus infections. J. Diary Scie. 87:4088-4096 (2004).
Motouri, M. Milk sphingomyelin accelerates enzymatic and morphological maturation of the intestine in artificially reared rats. *J. Pediatric Gastroenterology and Nutrition*, 36, 214-247, 2003.
Nakamura et al., Concentrations of sialyloligosaccharides in bovine colostrums and milk during prepartum and early lactation. *J. Daily Sci.*, 86, 1315-1320, 2003.

(Continued)

*Primary Examiner* — Patrick Lewis
*Assistant Examiner* — Everett White
(74) *Attorney, Agent, or Firm* — Knobbe, Martens, Olson & Bear, LLP (57) ABSTRACT

Processes for producing dairy products having lower levels of neutral lipids, and/or higher levels of polar lipids, by extraction using near critical carbon dioxide or dimethyl ether. These products may be used as ingredients in infant formulas. Infant formulas containing beta-serum are also claimed. "Beta-serum" means an aqueous dairy ingredient separated from dairy streams containing greater than 60% fat which have been through phase inversion from an oil-in-water to a water-in-oil emulsion, such as the serum produced during the production of butter oil.

8 Claims, 2 Drawing Sheets

OTHER PUBLICATIONS

Nakano, T. Sialic acid in milk: Functions and applications to infant formula. 1998 IDF Proceedings, p. 426-435, 1998.

Newburg, D.S. et al. Concentration of anti-rotovirus components of human milk over the course of lactation. Pediatric Res. 53, 3111A, 2003.

Newburg, D.S. et al. "Role of human milk lactadherin in proection against symtomaticrotavirus infection"Protection of breast-fed children against symptomatic rotovirus infection by human milk lactadherin. Lancet, 351, 1160-1164, 1998.

Park, E.J. et al. Diet-induced changes in membrane gangliosides in rat intestinal mucosa, plasma and brain. *J. Pediatric Gastroenterology and Nutrition*, 40: 487-495, 2005.

Peterson, J.A. Structural and functional aspects of three major glycoproteins of the human milk fat globule membrane. *Advances in Experim. Med. Biology,* 501, 179-187, 2001.

Schroten, H. et al. Inhibition of adhesion of S-fimbriated *E. coli* to buccal epithelial cells by human milk fat globule membrane components: a novel aspect of the proective function of mucins in the non-immunoglobulin fraction. Infec. And Immuni., 60 , 2893-2899, 1992.

Sprong, R.C. et al. Bactericidal activities of milk lipids. *Antimicrob. Agents and Chemothera.,* 45, 1298-1301, 2001.

Sprong, R.C. et al. Bovine milk fat components inhibit food-bourne pathogens. *Internat. Dairy J.,* 12, 209-215, 2002.

Wang, B. et al. The role and potential of sialic acid in human nutrition. *Eur. J. Clin. Nutrition,* 57, 1351-1369, 2003.

Werner, B. et al. Treatment of EFA deficiency with dietary triblycerides or phospholipids in a murine model of extrahepatic cholestasis. *Am. J. Physiol. Gastroinestr. Liver Physiol.,* 286, G822-G832, 2004.

Astaire et al., "Concentration of polar MFGM lipids from buttermilk by microfiltration and supercritical fluid extraction," J. Dairy Sci., 2003, vol. 86, pp. 2297-2307, American Dairy Science Association.

Shishikura et al., "Modification of butter oil by extraction with supercritical carbon dioxide," Agricultural and Biological Chemistry, 1986, vol. 50, No. 5, pp. 1209-1215, Agricultural Chemical Society of Japan.

International Search Report dated Jan. 13, 2006 from International Application No. PCT/NZ2005/000262.

International Preliminary Report on Patentability dated Nov. 15, 2006 from International Application No. PCT/NZ2005/000262.

European Search Report for Application No. EP 05801035 corresponding to the national phase for PCT dated Feb. 22, 2011 (10 pages).

Eggers et al., "Special Features of SCF Solid Extraction of Natural Products: Deoiling of Wheat Gluten and Extraction of Rose Hip Oil", Brazilian Journal of Chemical Engineering, Sep. 2000, vol. 17, Issue 3, pp. 1-6.

European Search Report for corresponding application PCT/NZ2005000262 for European Application No. 05801035.6 dated Feb. 22, 2011.

Office Action dated Jul. 9, 2012 for corresponding application PCT/NZ2005/000262 for European Application No. 05 801 035.6.

Vanderghem et al., "Milk fat globule membrane and buttermilks: from composition to valorization", Biotechnol. Agron. Soc. Environ., 2010, vol. 14, No. 3, pp. 485-500.

Akihiro Shishikura. et al. Modification of butter oil by extraction with supercritical carbon dioxide. *Agric. Biol. Chem.,* 50(5), 1209-1215, 1986.

Partial Translation of Russian Office Action responding to Applicants response dated May 21, 2010 (1 page) with a characterization of the Korobkina reference.

Partial Translation of Russian Office Action responding to Applicants response dated Sep. 16, 2009 (2 pages) with characterizations of the Korobkina and Kuznetsova references.

BETA-SERUM DAIRY PRODUCTS, NEUTRAL LIPID-DEPLETED AND/OR POLAR LIPID-ENRICHED DAIRY PRODUCTS, AND PROCESSES FOR THEIR PRODUCTION

REFERENCE TO RELATED APPLICATIONS

The present application is the U.S. National Phase under 35 U.S.C. §371 of International PCT application number PCT/NZ2005/000262, filed Oct. 12, 2005, which claims priority to New Zealand Application No. 535894, filed Oct. 12, 2004, New Zealand Application No. 535920, filed Oct. 13, 2004, and New Zealand Application No. 540445, filed May 31, 2005, each of which is incorporated by reference herein.

FIELD OF THE INVENTION

The present invention provides dairy products and processes for producing these products. The dairy products of the present invention include products suitable for use in infant formulas.

BACKGROUND

Commercially available infant formulas are typically produced using non-human milk. However the nutritional composition of human milk differs in some respects to that of non-human milk (such as cow, sheep, buffalo or goat).

Non-human whole milk such as cow, goat or sheep milk, contains a higher proportion of saturated fatty acids than human milk and is deficient in linoleic acid and alpha-linolenic acid, polyunsaturated fatty acids that are essential for normal infant growth and development. Also, butyric acid which is found in milk fat may cause putrid vomit in infants.

Therefore standard infant formulas are typically produced using low-fat dairy products such as skim milk. Using a reduced-fat dairy product means undesirable components in milk fat are not included in the infant formula, but it also means that phospholipid and (glyco)sphingolipid levels are significantly lower than those in human milk.

Research over the last 5-10 years has shown that increasing phospholipid and (glyco)sphingolipid levels in infant formulations to levels found in human milk (particularly ganglioside $GM_3$, ganglioside $GD_3$, ceramides and sphingomyelin) may lead to:

enhanced gut maturation, thereby reducing the risk of infection;
  prevention of infections by modifying gut intestinal flora and competitively binding antigens;
  prevention of the development of allergies; and
  optimal neural development.

It is therefore desirable to produce an infant formula containing sufficient levels of desirable lipids while minimising or eliminating undesirable ingredients.

One means currently used to achieve this is to add lipid-containing extracts and other individual ingredients to a base formulation thereby producing an infant formula with the desired nutritional profile. The lipid extracts may be produced using conventional extraction solvents (for example WO 94/18289 describes a method for extracting sphingomyelin from a phospholipid-containing fat concentrate using solvent extraction techniques). Such lipid extracts are expensive to produce. Furthermore, extensive toxicity and safety studies are required before regulatory approval in some jurisdictions can be obtained for their use.

Figure 1:
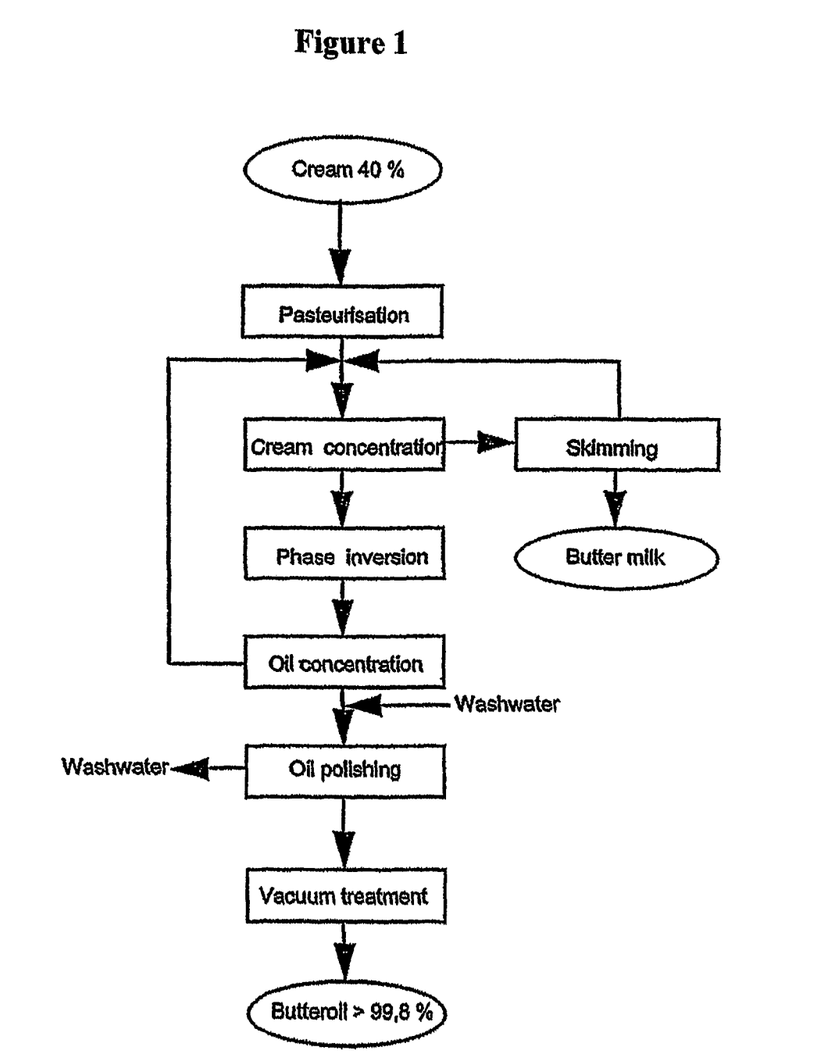
FIG. 1 shows a schematic drawing of the traditional process for producing butter-oil from cream and the production of buttermilk during this process.
Figure 2:
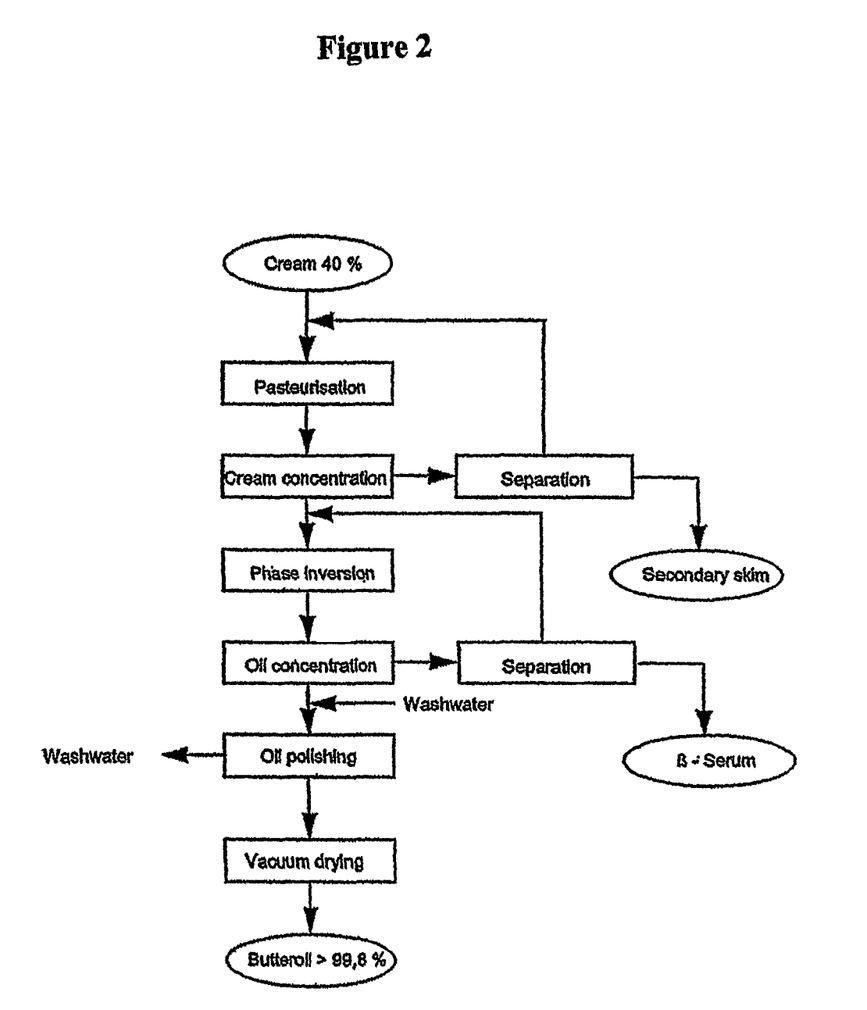
FIG. 2 shows a schematic drawing of the process for producing butter-oil from cream and the production of beta-serum during this process.

Another means used to achieve this goal is to include buttermilk in infant formulas. Buttermilk is the aqueous by-product stream produced during one of three processes:
  (1) Traditional butter manufacture using either the Fritz buttermaking or batch buttermaking process;
  (2) Traditional production of butter-oil (also known as anhydrous milk fat or AMF) from cream as shown in FIG. 1;
  (3) Production of butter-oil from cream using a two-sera process as shown in FIG. 2, where the buttermilk is produced by blending the secondary skim and beta-serum streams together.

Infant formulas containing buttermilk contain lesser amounts of undesirable components of milk fat than non-human milk, but higher levels of phospholipids and (glyco)sphingolipids than reduced-fat dairy products. However, the levels of these desirable lipids are not high enough for buttermilk to be used in a whey-dominant infant formula in order to achieve phospholipid and (glyco)sphingolipid levels similar to those in human milk.

Supercritical extraction using carbon dioxide as the solvent is known to extract neutral lipids from buttermilk powders. Astaire J. C., Ward R., German J. B., and Jimenez-Flores R. (2003) *Concentration of Polar MFGM Lipids from Buttermilk by Microfiltration and Supercritical Fluid Extraction* J. Dairy Sci. 86, 2297-2307 describes the supercritical extraction of buttermilk using carbon dioxide as the solvent to produce a product rich in protein, and enhanced in levels of polar lipids. However, the buttermilk powder so produced still has low levels of polar lipids, at a maximum of 2% of the dry powder mass, and is thus unsuitable for infant formula.

One possible way to provide a suitable product would be to separate the protein components from the lipid components in a dairy product.

Dimethyl ether (DME) has previously been used in the extraction of lipids from raw egg yolk (Yano et al U.S. Pat. No. 4,157,404) and dried egg powder (Yano et al U.S. Pat. No. 4,234,619). The process causes the fractionation of the lipid and protein components into separate streams. In U.S. Pat. No. 4,157,404, Yano states that while lipids can be extracted from raw egg yolks (75% moisture content), the proteins are denatured. In U.S. Pat. No. 4,234,619, Yano states that proteins are not denatured if the egg yolk is dry, but the phospholipids can only be partially extracted.

WO 2004/066744 describes the extraction of lipids from an aqueous dairy stream using near critical extraction where dimethyl ether is the solvent. WO 2004/066744 also discloses that neither supercritical $CO_2$ or subcritical dimethyl ether can extract lipids in useful yields from whey protein concentrate (WPC) dairy powders. However, this document does not disclose the extraction of lipids from powders rich in milk fat globule membrane material.

Attempts to extract lipids from dairy powder streams with high lactose contents (where high is at least 30% by mass of the total powder) by extraction using liquefied dimethyl ether have been unsuccessful.

It is therefore an object of the present invention to provide improved or alternative dairy products that can be used in infant formulations, and/or to at least provide the public with a useful choice.

DISCLOSURE OF THE INVENTION

The present invention relates to processes for producing dairy products that have lower levels of neutral lipids, or higher levels of polar lipids, or both. These products may be used as ingredients in infant formulas.

Thus the invention provides a process for producing a neutral lipid-depleted beta-serum dairy product comprising the following steps:

(1) providing dried beta-serum; and
(2) subjecting the beta-serum to a near critical carbon dioxide extraction process.

The term "beta-serum" as used herein means an aqueous dairy ingredient separated from dairy streams containing greater than 60% fat which have been through phase inversion from an oil-in-water to a water-in-oil emulsion. Cream is the preferred starting material for the production of beta-serum. For example beta-serum is produced during the production of butter-oil (also known as anhydrous milk fat or AMF) from cream as shown in FIG. 2.

Preferably the dried beta-serum is a powder.

Preferably the near critical carbon dioxide pressure is at least 73.2 bar and the temperature is in the range 304.2 to 373 K (supercritical region); or the carbon dioxide pressure is greater than or equal to the vapour pressure, and the temperature is in the range 273 to 304.1 K (subcritical region). More preferably, the carbon dioxide pressure is at least 250 bar, and the temperature in the range 313 to 353 K.

Preferably the lactose content of beta-serum is reduced before the extraction process. Preferably the lactose content is reduced by ultrafiltration. In a particularly preferred embodiment of the invention, the lactose content is further reduced by diafiltration during ultrafiltration.

Preferably, the lactose content is reduced to less than or equal to 30% (on a dry weight basis) before the near critical carbon dioxide step. More preferably, the lactose content is reduced to less than or equal to 25% (on a dry weight basis) before the near critical carbon dioxide step. More preferably, the lactose content is reduced to less than or equal to 20% (on a dry weight basis) before the near critical carbon dioxide step. Most preferably, the lactose content is reduced to less than or equal to 10% (on a dry weight basis) before the near critical carbon dioxide step.

Preferably the neutral lipid-depleted beta-serum dairy product is enriched in phospholipids, sphingolipids and glycolipids. Preferably the dairy product comprises approximately 50-70% protein (TN×6.38), preferably at least 60% protein (TN×6.38); 5-25% phospholipids and glycolipid, preferably 15-25% phospholipids and glycolipid; and 0-10% neutral lipid, preferably approximately 5% neutral lipid. Most preferably the dairy product comprises less than about 5% neutral lipids.

The invention also provides a process for producing a neutral lipid-depleted dairy product comprising the following steps:

(1) providing a dried high-fat low-lactose dairy starting material;
(2) subjecting the starting material to a near critical carbon dioxide extraction process, and subsequently fractionating the dairy product to produce a lipid enriched fraction and a lipid depleted fraction comprising the step of:

(3) subjecting this lipid-depleted dairy product to a liquid dimethyl ether extraction process.

Preferably the near critical carbon dioxide pressure is at least 73.2 bar and the temperature is in the range 304.2 to 373 K (supercritical region); or the carbon dioxide pressure is greater than or equal to the vapour pressure, and the temperature is in the range 273 to 304.1 K (subcritical region). More preferably, the carbon dioxide pressure is at least 250 bar, and the temperature in the range 313 to 353 K.

Preferably, the dimethyl ether is liquefied and pressurised to a pressure at least equal to the vapour pressure at the temperature of the extraction, and more preferably is at least 10 bar greater than the vapour pressure. Preferably the temperature is in the range 273-373 K, and more preferably in the range 293-353 K.

The term "high fat" means containing greater than 10% fat w/w of solids, preferably greater than 15% fat w/w of solids and most preferably greater than 20% fat w/w of solids.

The term "low-lactose" means that the lactose content is less than or equal to 30% (on a dry weight basis). More preferably, the lactose content is less than or equal to 25% (on a dry weight basis). More preferably, the lactose content is less than or equal to 20% (on a dry weight basis). Most preferably, the lactose content is less than or equal to 10% (on a dry weight basis).

Preferably the lactose content of beta-serum is reduced before the extraction process. Preferably the lactose content is reduced by ultrafiltration. In a particularly preferred embodiment of the invention, the lactose content is further reduced by diafiltration during ultrafiltration.

Preferably the high-fat low-lactose dairy starting material is lactose-reduced beta-serum. Alternatively the high-fat low-lactose dairy starting material is lactose-reduced buttermilk.

Preferably the high-fat low-lactose dairy starting material is spray dried before the near critical carbon dioxide step. Alternatively high-fat low-lactose dairy starting material is freeze-dried or vacuum dried before the near critical carbon dioxide step.

The lipid enriched fraction preferably contains at least 50% phospholipids and glycolipids and is substantially reduced in neutral lipids. More preferably, the lipid enriched fraction contains at least 80% phospholipids and glycolipids, and is substantially free of neutral lipids.

In a preferred embodiment the lipid depleted fraction is enriched in milk fat globule membrane proteins and contains, on a powder basis 65-79% (TN×6.38) protein, 8-12% lactose, 5-11% fat including phospholipids (4-9% of fraction), more preferably about 72% protein (TN×6.38), 9% lactose, 8% fat including phospholipids (6% of fraction), 5% ash and 4% moisture.

The invention also provides a process for producing a lipid enriched fraction and a lipid depleted fraction comprising the following steps:

(1) providing a high-fat low-lactose dairy starting material; and
(2) subjecting the starting material to a liquid dimethyl ether extraction process.

The lipid depleted fraction contains all of the milk fat globule membrane proteins and therefore could be used in infant formulas to deliver health benefits that are more strongly associated with milk fat globule membrane protein components.

Preferably, the dimethyl ether is liquefied and pressurised to a pressure at least equal to the vapour pressure at the temperature of the extraction, and more preferably is at least 10 bar greater than the vapour pressure. Preferably the temperature is in the range 273-373 K, and more preferably in the range 293-353 K.

The term "high fat" means containing greater than 10% fat w/w of solids, preferably greater than 15% fat w/w of solids and most preferably greater than 20% fat w/w of solids.

The term "low-lactose" means that the lactose content is less than or equal to 30% (on a dry weight basis). More preferably, the lactose content is less than or equal to 25% (on a dry weight basis). More preferably, the lactose content is less than or equal to 20% (on a dry weight basis). Most preferably, the lactose content is less than or equal to 10% (on a dry weight basis).

Preferably the lactose content of beta-serum is reduced before the extraction process. Preferably the lactose content is reduced in beta-serum or the starting material by ultrafiltration. In a particularly preferred embodiment of the invention, the lactose content is further reduced by diafiltration during ultrafiltration.

Preferably the high-fat low-lactose dairy starting material is lactose-reduced beta-serum. Alternatively the high-fat low-lactose dairy starting material is lactose-reduced buttermilk.

Preferably the high-fat low-lactose dairy starting material is spray dried before the liquid dimethyl ether extraction step. Alternatively high-fat low-lactose dairy starting material is freeze-dried or vacuum dried before the liquid dimethyl ether extraction step.

In one embodiment, the lipid enriched fraction contains at least 40% phospholipids and glycolipids. This process does not take out the neutral lipids first with $CO_2$, and because DME extracts both polar and neutral lipids, the DME lipid extract will contain about the same ratio of neutral lipid-to-phospholipid as in the feed. For example, for a feed containing a neutral lipid to phospholipid ratio of about 1.2, the composition of the DME lipid extract on a 3% moisture basis is 80-90% fat including phospholipids (35-45% of fraction), 5-9% ash, 2-5% lactose and 2-3% moisture.

The lipid depleted fraction is enriched in milk fat globule membrane proteins and contains, on a powder basis, about 60-80% protein (TN×6.38), 6-12% lactose, 5-11% fat including phospholipids (5-9% of fraction), preferably 73% protein (TN×6.38), 9% lactose, 8% fat including phospholipids (7% of fraction), 5% ash and 3% moisture.

The level of protein in the products described in this specification is calculated from the total nitrogen (TN) in a sample multiplied by a factor of 6.38.

The invention also provides products produced by the processes of the present invention, and compositions and infant formulas containing such products.

The term "infant formula" as used herein includes formulas designed for infants 0-12 months old, formulas designed for infants 6-12 months old (follow-on-formula) and formulas designed for toddlers and young children (1-7 years, growing-up milks/milk powders).

Preferably, the invention provides an infant formula comprising:
(a) 30-60% lactose
(b) 15-35% vegetable oils
(c) 0-40% skim milk powder
(d) 0-40% whey protein concentrate
(e) 1-50% a product produced by a process of the present invention.

More preferably, the invention provides an infant formula comprising:
(a) 40-60% lactose
(b) 20-30% vegetable oils
(c) 10-15% skim milk powder
(d) 6-8% 80% protein whey protein concentrate (WPC80)
(e) 1-5% a product produced by a process of the present invention.

The infant formula may also comprise 2-4% of at least one of the following:
(a) vitamin premix
(b) mineral premix
(c) lecithin
(d) antioxidant
(e) stabiliser
(f) nucleotides.

In a preferred embodiment, these infant formulas may be formulated to provide between 2700 and 3000 kJ/L.

The invention also provides an infant formula comprising beta-serum as an ingredient.

Preferably, the infant formula comprises:
(a) 30-60% lactose
(b) 15-35% vegetable oils
(c) 0-40% skim milk powder
(d) 0-40% whey protein concentrate
(e) 1-50% beta-serum powder.

More preferably, the infant formula comprises:
(a) 40-60% lactose
(b) 20-30% vegetable oils
(c) 10-15% skim milk powder
(d) 6-8% 80% protein whey protein concentrate (WPC80)
(e) 1-10% beta-serum powder.

Most preferably, the infant formula comprises:
(a) 40-60% lactose
(b) 20-30% vegetable oils
(c) 10-15% skim milk powder
(d) 6-8% 80% protein whey protein concentrate (WPC80)
(e) 2-5% beta-serum powder.

The infant formula may also comprise 2-4% of at least one of the following:
(a) vitamin premix
(b) mineral premix
(c) lecithin
(d) antioxidant
(e) stabiliser
(f) nucleotides.

In a preferred embodiment, these infant formulas may be formulated to provide between 2700 and 3000 kJ/L.

The invention also provides an infant formula comprising as an ingredient a fraction obtained from beta-serum enriched in polar lipids or depleted in neutral lipids or both.

Preferably the infant formula comprises:
(a) 30-60% lactose
(b) 15-35% vegetable oils
(c) 0-40% skim milk powder
(d) 0-40% whey protein concentrate
(e) 1-50% a fraction obtained from beta-serum enriched in polar lipids or depleted in neutral lipids or both.

More preferably, the infant formula comprises:
(a) 40-60% lactose
(b) 20-30% vegetable oils
(c) 10-15% skim milk powder
(d) 6-8% 80% protein whey protein concentrate (WPC80)
(e) 1-5% a fraction obtained from beta-serum enriched in polar lipids or depleted in neutral lipids or both.

The infant formula may also comprise 2-4% of at least one of the following:
(a) vitamin premix
(b) mineral premix
(c) lecithin
(d) antioxidant
(e) stabiliser
(f) nucleotides.

In a preferred embodiment, these infant formulas may be formulated to provide between 2700 and 3000 kJ/L.

The products, compositions and infant formulas of the present invention may be administered to provide health benefits.

For example, the following health benefits are contemplated:
enhancing gut maturation
reducing the risk of infection
modifying gut intestinal flora and competitively binding antigens
preventing infections preventing the development of allergies
optimizing neural development
treating a dermatological condition
optimizing immune system development
maintaining optimal immune function
preventing or treating colon cancer.

The inventors have discovered that the levels of phospholipids and gangliosides in beta-serum make it suitable to be used in the fortification of infant formulas. The inventors have also discovered that dairy products which are high in fat but low in lactose (including low-lactose beta-serum) may be processed to reduce the levels of neutral lipids, or increase the levels of polar lipids, or both, thus creating products which are even more suitable in the fortification of infant formulas.

The processes described in the invention utilise processing and extraction techniques which do not leave toxic residues, therefore further processing of the final dairy product is not required.

Additionally, the use of ultrafiltration and near critical extraction with carbon dioxide as the solvent means it should be easier to obtain regulatory approval for the use of this product as there is minimal or no solvent residue in the product compared with the use of conventional solvents such as acetone and ethanol. Additionally conventional solvents extensively denature proteins, making the use of these solvents unsuitable for producing dairy products for infant formula applications.

The term "dairy" as used herein means of, containing, or concerning milk and its products. It includes milk produced by humans, cows, buffalo and goats but is not limited to these animals.

Every substance has its own "critical" point at which the liquid and vapour state of the substance become identical. Above but close to the critical point of a substance, the substance is in a fluid state that has properties of both liquids and gases. The fluid has a density similar to a liquid, and viscosity and diffusivity similar to a gas. The term "supercritical" as used herein refers to the pressure-temperature region above the critical point of a substance. The term "subcritical" as used herein refers to the pressure-temperature region equal to or above the vapour pressure for the liquid, but below the critical temperature. The term "near critical" as used herein encompasses both "supercritical" and "subcritical" regions, and refers to pressures and temperatures near the critical point.

EXAMPLES

The following Examples further illustrate practice of the invention.

Example 1

Extraction of Whey Protein Concentrate Powder

This example shows that the extraction of lipids from powder with high concentrations of whey proteins results in very low yields of lipid. Whey protein concentrate powders containing 80.26% by mass protein, 6.83% by mass lipid, and 3.57% moisture were extracted with the near critical solvents carbon dioxide, propane, and dimethyl ether (DME). The solvent, pressure, temperature, mass of solids used, mass of solvent used, and extract solids and lipid yields are given in table 1.

TABLE 1

Lipid yields for the extraction of WPC solids with various solvents

| Solvent | Pressure bar | Temperature K | Mass of solids g | Mass of solvent used, kg | Mass of Extract, g | Yield, % solids | Yield, % lipids |
|---|---|---|---|---|---|---|---|
| $CO_2$ | 300 | 317.1 | 3600.0 | 18.9 | 2.69 | 0.07 | 1.05 |
| Propane | 32 | 314.1 | 3600.0 | 11.8 | 3.97 | 0.11 | 1.56 |
| DME | 32 | 314.1 | 3600.0 | 10.9 | 4.58 | 0.13 | 1.80 |
| DME | 55 | 323.9 | 129.2 | 0.41 | 0.34 | 0.26 | 3.60 |
| DME | 55 | 333.1 | 129.1 | 0.42 | 0.56 | 0.43 | 5.95 |

The lipid yields are very low and an increase in extraction temperature does not increase the extraction yield to desired levels.

Example 2

Extraction of Standard Lactose Beta Serum Powders with Supercritical

This example shows that extraction of neutral lipids is possible from beta serum powder with standard lactose content, but that the yield is significantly less than with powders where the lactose content has been reduced. The protein and total phospholipid content of the final powder are low. Beta serum powders with the following compositions were extracted with supercritical $CO_2$ at 300 bar and 313 K: batch 1 total protein 29.4%, lactose 42.5%, total fat 19.7%, moisture 3.1% and ash 6%; batch 2 total protein 31.7%, lactose 44.6%, total fat 20.6%, moisture 2.3% and ash 6.1%. The total fat is made up of neutral lipids, phospholipids, gangliosides, ceramides and cerebrosides, such as lactosylceramide. The fat extraction results, and mass of phospholipids in the extract are shown in table 2. Only neutral lipids are extracted by supercritical $CO_2$ as the other types of fat, and especially phospholipids, are not soluble in this solvent.

TABLE 2

Lipid yields for the extraction of standard lactose beta serum powders with $CO_2$

| Batch | Mass of solids g | $CO_2$ used kg | Mass of extract g | Mass of phospholipid g | % Yield, total lipids | % Yield, neutral lipids |
|---|---|---|---|---|---|---|
| 1 | 11108.3 | 73.305 | 944.1 | 0 | 43.14 | 72.3 |
| 2 | 9618.4 | 69.894 | 714.3 | 0 | 36.05 | 62.6 |

The powder compositions after extraction were: batch 1 total protein 32.0%, lactose 47.9%, total fat 13.6%, moisture 3.8%, and ash 3%; batch 2 total protein 34.2%, lactose 44.2%, total fat 11.3%, moisture 3.5%, and ash 6.3%.

The powder from batch 2 was tested for whey protein denaturation. It was assumed that the casein proteins were not denatured. A representative sample of powder was taken, and mixed with water to give approximately 3% whey proteins in solution. The caseins were precipitated at pH 4.6 with hydrochloric acid, and removed from solution by centrifuging. The composition of the remaining soluble whey proteins was determined by reverse phase chromatography. The soluble whey proteins decreased from 13.43 g/100 g of protein in the feed to 8.39 g/100 g of protein in the extracted powder. There was a very large decrease in native (undenatured) beta-lactoglobulin. Denaturation of the protein makes the powder less suitable for infant formula than those products described in Example 3.

Example 3

Extraction of Low Lactose Beta Serum Powders with Supercritical $CO_2$

This example shows that extraction of neutral lipids with greater than 90% yield is possible from low lactose beta serum powders. The reduction in lactose content of the beta serum was carried out by ultrafiltration to a volume concentration factor of 8. The protein and total phospholipid contents of the final powder are high. Low lactose beta serum powders with the following compositions were extracted with supercritical $CO_2$ at 300 bar and 313 K: batch 3 low lactose total protein 48.3%, lactose 14.4%, total fat 30.1%, moisture 3.0% and ash 4.8%; batch 4 total protein 52.0%, lactose 7.8%, total fat 31.9%, moisture 2.7% and ash 4.8%. The fat extraction results, and mass of phospholipids in the extract are shown in table 3. Only neutral lipids are extracted by supercritical $CO_2$ as the other types of fat, and especially phospholipids, are not soluble in this solvent.

TABLE 3

Lipid yields for the extraction of low lactose beta serum powders with $CO_2$

| Batch | Mass of solids g | $CO_2$ used kg | Mass of extract g | Mass of phospholipid in extract g | % yield, total lipids | % yield, neutral lipids |
|---|---|---|---|---|---|---|
| 3 | 6981.2 | 80.399 | 1085.7 | 0 | 51.6 | 90.2 |
| 4 | 6375.2 | 79.601 | 1085.4 | 0 | 53.4 | 94.0 |

The powder compositions after extraction were: batch 3 total protein 57.3%, lactose 15.1%, total fat 18.7%, total phospholipids 14.4%, moisture 4.1%, and ash 5.7%; batch 4 total protein 61.6%, lactose 10.1%, total fat 21.9%, total phospholipids 16.8%, moisture 4.5%, and ash 5.6%. Batches 3 and 4 extracted with supercritical $CO_2$ also had enhanced levels of gangliosides at ~0.7% by mass. The remaining difference between the total fat in the residual powder, and the phospholipid and ganglioside content, is made up of mostly ceramides and cerebrosides, especially lactosylceramide. The powder from batches 3 (low lactose) and 4 (very low lactose) were tested for protein denaturation to ensure that it was suitable for use in infant formula as per example 2. The soluble whey proteins increased from 12.20 g/100 g of protein in the feed to 13.57 g/100 g of protein in the extracted powder for batch 3; and from 12.44 g/100 g of protein in the feed to 12.94 g/100 g of protein in the extracted powder for batch 4. The lack of denaturation of the protein, and the high protein and phospholipid contents of the extracted low lactose powders make them very suitable for infant formula.

Example 4

Extraction of Standard and Low Lactose Beta Serum Powders with Supercritical $CO_2$ Followed by Near Critical Dimethyl Ether This example shows that the extraction of phospholipids in high yield from beta serum powder that has been pre-extracted with supercritical $CO_2$ is only possible when the lactose content of the powder has been reduced; and that dimethyl ether extraction temperature influences the extraction yield. The example also shows that it is possible to control the final phospholipids content in the powder after extraction by controlling the extraction temperature. Partially defatted powder batches 2 (standard lactose content, feed mass 4318.7 g), 3 (low lactose, feed mass 2952.6 g) and 4 (very low lactose, feed mass 2668.2 g) produced in examples 2 and 3 were re-extracted with dimethyl ether at 40 bar and 293 K using 12.236, 13.828 and 5.117 kg respectively; and then re-extracted with dimethyl ether at 40 bar and 323 K using 13.037, 10.962 and 6.965 kg respectively. The extraction yield results are shown in table 4

TABLE 4

Phospholipid and total lipid yields from standard and low lactose powders using dimethyl ether after supercritical $CO_2$ extraction

| | | DME extraction yields at 293K | | DME extraction yields at 323K | | Overall lipid yields, % | |
|---|---|---|---|---|---|---|---|
| Batch | Lactose content | Total lipid, g | % Phospholipid | Total lipid, g | % Phospholipid | Phospholipid | Total lipid |
| 2 | 47.9 | 56.1 | 64.3 | 14.5 | 63.7 | 14.2 | 61.0 |
| 3 | 15.1 | 338.6 | 76.8 | 38.9 | 75.5 | 69.1 | 82.6 |
| 4 | 10.1 | 318.8 | 77.8 | 32.2 | 77.3 | 60.3 | 82.1 |

The total lipid extract also contained significant levels of ganglioside, at 2.5% by mass for batch 4 at 293 K; and 1% by mass for batch 4 at 323 K. The protein contents of all powders increased relative to the feed after dimethyl ether extraction.

13.426, 12.666 and 13.938 kg respectively; and then re-extracted with dimethyl ether at 40 bar and 323 K using 15.727, 11.673 and 11.123 kg respectively. The extraction yield results are shown in table 5

TABLE 5

Phospholipid and total lipid yields from standard and low lactose powders using dimethyl ether at 293 K and 323 K

| Batch | Lactose content % | DME extraction yields at 293 K | | DME extraction yields at 323 K | | Overall lipid yields, % | |
|---|---|---|---|---|---|---|---|
| | | Total lipid, g | % Phospholipid | Total lipid, g | % Phospholipid | Phospholipid, % | Total |
| 2 | 44.6 | 189.4 | 21.8 | 50.7 | 27.3 | 14.9 | 26.9 |
| 3 | 14.4 | 752.9 | 27.5 | 101.9 | 66.8 | 62.9 | 82.3 |
| 4 | 7.8 | 869.1 | 31.6 | 72.7 | 69.9 | 67.4 | 85.3 |

The powder compositions after $CO_2$ and dimethyl ether extractions were: batch 2 total protein 34.6%, lactose 47.1%, total fat 8.9%, total phospholipids 6.3%, moisture 2.7%, and ash 6.7%; batch 3 total protein 64.4%, lactose 17.9%, total fat 8.4%, total phospholipids 5.7%, moisture 3.6%, and ash 5.4%; batch 4 total protein 73.2%, lactose 8.7%, total fat 7.6%, moisture 4.3%, and ash 5.1%. Both powders had significant levels of gangliosides, at approximately 0.4% by mass. The remaining difference between the total fat in the residual powder, and the phospholipid and ganglioside content, is made up of mostly ceramides and cerebrosides, especially lactosylceramide.

The powder from batches 2 (standard lactose content), 3 (low lactose) and 4 (very low lactose) after supercritical $CO_2$ and dimethyl ether extraction were tested for protein denaturation as per example 2. The soluble whey proteins decreased from 13.43 g/100 g of protein for batch 2 to 8.00 g/100 g of protein in the DME extracted powder. The soluble whey proteins increased from 12.20 g/100 g of protein in the feed to 15.23 g/100 g of protein in the extracted powder for batch 3; and from 12.44 g/100 g of protein in the feed to 16.98 g/100 g of protein in the extracted powder for batch 4. The lack of protein denaturation, and the high protein and phospholipid contents of the extracted low lactose powders make them very suitable for infant formula. Extraction with dimethyl ether has had the unexpected effect of increasing the apparent whey protein solubility, which is initially diminished by the removal of lactose from the feed.

Example 5

Extraction of Standard and Low Lactose Powders with Dimethyl Ether

This example shows that the extraction of both neutral lipids and phospholipids in high yield from beta serum powder is only possible when the lactose content of the powder has been reduced when using dimethyl ether as the solvent without previously extracting the powder with supercritical $CO_2$; and that dimethyl ether extraction temperature influences the extraction yield. The example also shows that it is possible to control the final phospholipids content in the powder after extraction by controlling the extraction temperature. Batch 2 (standard lactose content, feed mass 4245.6 g) with composition as given in example 2; and batches 3 (low lactose, feed mass 3407.5 g) and 4 (very low lactose, feed mass 3204.4 g) with compositions as given in example 3 were extracted with dimethyl ether at 40 bar and 273293 K using The protein contents of all powders increased relative to the feed after dimethyl ether extraction. The powder compositions after dimethyl ether extractions were: batch 2 total protein 34.8%, lactose 44.2%, total fat 16.3%, phospholipids 8.3%, moisture 2.3%, and ash 6.2%; batch 3 total protein 65.1%, lactose 15.3%, total fat 8.3%, phospholipids 6.7%, moisture 2.2%, and ash 5.3%; batch 4 total protein 73.3%, lactose 8.8%, total fat 8.3%, total phospholipids 6.8%, moisture 2.6%, and ash 5.2%. For batches 3 and 4, the difference between the total fat and phospholipids content is made up of gangliosides, ceramides and cerebrosides.

The powder from batches 2 (standard lactose content), 3 (low lactose) and 4 (very low lactose) after dimethyl ether extraction were tested for protein denaturation as per example 2. The soluble whey proteins increased from 13.43 g/100 g of protein to 14.38 g/100 g for batch 1; from 12.20 g/100 g of protein in the feed to 15.47 g/100 g of protein in the extracted powder for batch 3; and from 12.44 g/100 g of protein in the feed to 15.55 g/100 g of protein in the extracted powder for batch 4. The lack of protein denaturation and the high protein content of the DME extracted low lactose powders make them suitable for a wide range of food applications, especially sports nutrition. Extraction with dimethyl ether has had the unexpected effect of increasing the apparent whey protein solubility, which is initially diminished by the removal of lactose from the feed. The extraction yield of total lipids and phospholipids is very low for powder with high lactose contents (batch 2) when using dimethyl ether alone as the extraction solvent. The high content of neutral lipids makes this powder less suitable for infant formula.

Example 6

Levels of Phospholipids and Gangliosides in Selected Dairy Products

The phospholipid content of human milk typically ranges from 200-400 mg/L (Jensen R G (1989) *Textbook of Gastroenterology and Nutrition in Infancy*, $2^{nd}$ Edition, E. Lebenthal (Ed), Raven Press Ltd, New York, 157-208).

According to Harzer G, Haug M, Dieterich I & Gentner P R (1983) Changing patterns of human milk lipids in the course of the lactation and during the day. *American Journal of Clinical Nutrition*, 37, 612-621, the phospholipid composition of human milk 36 days postpartum is phosphatidylcholine (PC) 24.9%, phosphatidyletlianolamine (PE) 27.7%, phosphatidylserine (PS) 9.3%, phosphatidylinositol (PI) 5.4% and sphingomyelin (SM) 32.4%.

Table 6 shows the phospholipid contents of:
beta-serum powder product A),
low lactose beta-serum powder (product B),
neutral lipid-depleted beta serum powder (product C), and
the lipid extract (product D) and residual powder (product E) of product C after DME extraction.

These products are derived from bovine milk.

Product A (beta-serum powder) was produced using the method illustrated in FIG. 2. Product B (low lactose beta-serum powder) was produced by ultrafiltration of product A. Product C was produced using the process as described in Example 3. Products D and E were produced using the process as described for batch 4 in Example 4, except that a single stage DME extraction was carried out at 55° C.

The total lipid content was measured by a modified Röse-Gottlieb method where the lipid extracts were vacuum evaporated and freeze-dried cf. oven drying (low temperature drying minimises the phospholipid hydrolysis that occurs during oven drying due to the presence of ammonia in the lipid extracts). The total phospholipid content was calculated by multiplying the phosphorus content of the modified Röse-Gottlieb fat extract by 25.5 (refer McDowell AKR (1958) Phospholipids in New Zealand dairy products. *Journal of Dairy Research*, 25, 192-202.)

Individual phospholipids were measured by $^{31}$P NMR.

Pan X L & Izumi T (2000) Variation of the ganglioside compositions of human milk, cow's milk and infant formulas. *Early Human Development*, 57, 25-31 show that ganglioside GD3 and ganglioside GM3 account for about 60% of the total gangliosides in human milk and that the total ganglioside content of infant formula, as measured by the lipid-bound sialic acid (LBSA) content, is significantly lower than that of human milk. The content of ganglioside GD3 plus ganglioside GM3 in human milk ranges from 10-16 mg/L depending on the stage of lactation (Nakano et al., 2001 Sialic acid in human milk: Composition and functions. *Acta Paediatrica Taiwanica*, 42, 11-17). Table 6 shows the ganglioside GD3 and ganglioside GM3 contents of product A, product B, product C, product D and product E. The ganglioside GD3 and ganglioside GM3 levels were calculated as follows: samples were dissolved in choloroform/methanol/water 6:3:0.45 and filtered. The gangliosides were then separated into GM3 and GD3 fractions by strong anion exchange solid phase extraction and sialic acid quantified by the Resorcinol method of Svennerholm (Svennerholm, L. 1957. Quantitative estimation of sialic acids. II. A colorimetric resorcinol-hydrochloric acid method. *Biochim. Biophys. Acta*. 24:604-611). The sialic acid levels were then used to calculate the concentrations of GM3 and GD3.

TABLE 6

Polar lipid compositions of products A-E

| Component (% w/w) | A | B | C | D | E |
|---|---|---|---|---|---|
| Total lipid | 20.6 | 33.9 | 20.9 | 86.1 | 6.3 |
| Total phospholipid | 9.7 | 15.1 | 17.5 | 66.6 | 5.2 |
| Phosphatidylcholine | 2.6[1] | 4.1 | 4.9 | 13.3 | 1.7 |
| Phosphatidylethanolamine | 2.7[1] | 4.2 | 4.8 | 22.0 | 1.0 |
| Phosphatidylserine | 0.8[1] | 1.3 | 1.7 | 8.2 | 0.36 |
| Phosphatidylinositol | 0.6[1] | 1.0 | 1.2 | 6.1 | 0.35 |
| Sphingomyelin | 2.7[1] | 4.2 | 4.4 | 15.1 | 1.8 |
| Ganglioside GD3 | 0.36 | 0.58[2] | 0.66[3] | 2.09 | 0.28 |
| Ganglioside GM3 | 0.04 | 0.06[2] | 0.05[3] | 0.34 | 0.0 |

[1] Estimated from measured values for LLBSP.
[2] Estimated from mean values for standard beta serum powder.
[3] Estimated. These are the results of another BPC60 sample.

Example 7

Infant Formulas Containing Selected Dairy Product

Table 7 shows the percentage of each product (A, B, C, D and E) that needs to be added to infant formula on a powder basis in order to increase the "total" ganglioside (ganglioside GD3 plus ganglioside GM3) content of ready-to-feed (RTF) infant formula (IF) by 16 mg/L.

The assumptions are that the baseline levels of these components in standard infant formula are 0%, that the infant formula powder is reconstituted to 13% total solids, and that the density of the RTF IF is 1.0 kg/L.

The beta serum product addition rates shown in Table 7 also increase the individual phospholipid contents of the infant formula to levels greater than those found in human milk, the only exception being product E, where the added PE and PS levels are slightly lower than those found in human milk (base levels of these components in standard infant formula would probably compensate for these shortfalls). Note that product D could be used instead of soy lecithin, which is commonly used to instantise infant formulas, thereby making them easier to reconstitute.

TABLE 7

Added levels of polar lipid components in RTF IF at 13% total solids

| Added Component (mg/L) | Human Milk | A | B | C | D | E |
|---|---|---|---|---|---|---|
| Addition rate (% of powdered infant formula) | NA | 3.08 | 1.92 | 1.73 | 0.51 | 4.40 |
| Total phospholipid | 300[4] | 388 | 377 | 394 | 442 | 297 |
| Phosphatidylcholine | 75 | 105 | 102 | 110 | 88 | 97 |
| Phosphatidylethanolamine | 83 | 109 | 105 | 108 | 146 | 57 |
| Phosphatidylserine | 28 | 34 | 32 | 38 | 54 | 21 |
| Phosphatidylinositol | 16 | 26 | 25 | 27 | 40 | 20 |
| Sphingomyelin | 97 | 108 | 105 | 99 | 100 | 103 |
| Ganglioside GD3 + GM3 | 16 | 16 | 16 | 16 | 16 | 16 |
| Added neutral lipid[5] | NA | 436 | 469 | 76 | 129 | 63 |

[4] Mean of range reported by Jensen (1989). Individual phospholipids are calculated based on this mean value and the percentages reported by Harzer et al. (1983).
[5] Neutral lipid is estimated as the difference between the total lipid and phospholipid. This is, however, an over-estimate as it includes the glycolipids (e.g. ceramides, gangliosides). To put the added amount of neutral lipid into perspective, the ANZFA range for fat in RTF IF is 21600-45000 mg/kg i.e. the impact of added neutral lipid on the balanced fatty acid profile of IF is small, particularly with products C, D and E.

Example 8

Infant Formulas

Ready-to-feed total solids=13.0%
Whey-to-casein ratio=60:40 (whey protein at least 60.0% of total protein)
Protein target[6]=14 g/L
Fat target[6,7]=35.4-37.6 g/L
Carbohydrate target[6]=72.1-72.9 g/L

[6] Based on Similac Advance with Iron and Enfamil LIPIL with Iron levels, noting that the Enfamil LIPIL with Iron levels were reported as g per 100 cal (cf. g/100 g) so that a RTF energy content of 2800 kJ/L for this product has been assumed.

[7] Estimated levels for Similac and Enfamil products respectively.

These target levels meet the ANZFA energy requirements of infant formula (2700-3000 kJ/L). The difference between the sum of the protein, carbohydrate and fat levels and the 13% total solids target was assumed to be the vitamin and mineral premixes, antioxidants, lecithin (used to instantise the final infant formula), and possibly nucleotides/nucleosides. These components typically amounted to about 3% of the powdered infant formula.

The oil mix used in preparing infant formulas typically comprises a blend of vegetable oils in order to achieve a fatty acid profile close to that of human milk. Vegetable oils that are commonly used in infant formula are high oleic palm olein, high oleic sunflower oil, high oleic safflower oil, coconut oil and soy oil. Furthermore, many of the premium brands also contain fish/microalgal and fungal oils as sources of docosahexaenoic acid and arachidonic acid respectively.

Infant formula 1 (Using beta serum powder—product A):
A nutritional formula comprising:
a. About 46.54% lactose
b. About 26.92% oil mix (comprising 45% high oleic palm olein, 20% soy oil, 20% coconut oil and 15% of either high oleic safflower oil or high oleic sunflower oil)
c. About 13.85% skim milk powder (SMP)
d. About 6.54% ALACEN 392 (80% protein whey protein concentrate)
e. About 3.15% beta serum powder (product A)
f. About 3.00% vitamin and mineral premixes, lecithin, antioxidants/stabilisers, optional components e.g. nucleotides Infant formula 2 (Using low lactose beta serum powder—product B):
A nutritional formula comprising:
a. About 47.69% lactose
b. About 26.92% oil mix
c. About 13.85% SMP
d. About 6.54% ALACEN 392
e. About 1.92% low lactose beta serum powder (product B)
f. About 3.08% vitamin and mineral premixes, lecithin, antioxidants/stabilisers, optional components e.g. nucleotides Infant formula 3 (Using—product C):
A nutritional formula comprising:
a. About 47.69% lactose
b. About 26.92% oil mix
c. About 13.85% SMP
d. About 6.54% ALACEN 392
e. About 1.73% product C
f. About 3.27% vitamin and mineral premixes, lecithin, antioxidants/stabilisers, optional components e.g. nucleotides Infant formula 4 (Using product D):
A nutritional formula comprising:
a. About 46.54% lactose
b. About 26.92% oil mix
c. About 16.15% SMP
d. About 6.77% ALACEN 392
e. About 0.51% product D
f. About 3.11% vitamin and mineral premixes, lecithin, antioxidants/stabilisers, optional components e.g. nucleotides Infant formula 5 (Using product E):
A nutritional formula comprising:
a. About 50.77% lactose
b. About 26.92% oil mix
c. About 8.23% SMP
d. About 6.00% ALACEN 392
e. About 4.40% product E
f. About 3.68% vitamin and mineral premixes, lecithin, antioxidants/stabilisers, optional components e.g. nucleotides The above examples are illustrations of practice of the invention. It will be appreciated by those skilled in the art that the invention may be carried out with numerous variations and modifications. For example temperatures and pressures for the extractions may be varied as can the protein and lactose contents of the starting materials.

Also, it will be appreciated that the dairy products of the present invention may also be used in products for dermatological or general nutritional benefit in the consumer, including sports nutrition and food for the elderly.

The term "comprising" as used in this specification means 'consisting at least in part of', that is to say when interpreting statements in this specification which include that term, the features, prefaced by that term in each statement, all need to be present but other features can also be present.

What we claim is:

1. A method of producing an infant formula, the method comprising
   providing isolated beta-serum or isolated low-lactose beta-serum, the beta-serum or low-lactose beta-serum being isolated from cream after phase inversion of the cream during production of butteroil or anhydrous milk fat from cream, wherein the low-lactose beta-serum comprises less than 30% lactose on a dry weight basis, and
   combining the beta-serum or the low-lactose beta-serum with a source of protein, a source of lipid and a source of carbohydrate to produce an infant formula.

2. The method of claim 1, wherein a first serum is removed from the cream before the cream is subjected to phase inversion.

3. The method of claim 1, wherein the infant formula includes 1-10% beta-serum or low-lactose beta-serum.

4. The method of claim 1, wherein the source of protein comprises skim milk powder or whey protein concentrate or a combination thereof, the source of lipid comprises vegetable oil, or the source of carbohydrate comprises lactose, or a combination thereof.

5. The method of claim 4, the infant formula comprising:
   (a) 30-60% lactose
   (b) 15-35% vegetable oils
   (c) 0-40% skim milk powder
   (d) 0-40% whey protein concentrate
   (e) 1-50% beta-serum or low-lactose beta-serum powder.

6. The method of claim 4, the infant formula comprising:
   (a) 40-60% lactose
   (b) 20-30% vegetable oils
   (c) 10-15% skim milk powder
   (d) 6-8% 80% whey protein concentrate (WPC80)
   (e) 1-10% beta-serum or low-lactose beta-serum powder.

7. The method of claim 4, the infant formula comprising:
(a) 40-60% lactose
(b) 20-30% vegetable oils
(c) 10-15% skim milk powder
(d) 6-8% 80% whey protein concentrate (WPC80)
(e) 2-5% beta-serum or low-lactose beta-serum powder.

8. The method of claim 1, wherein the infant formula provides between 2700 and 3000 kJ/L.

* * * * *